(12) United States Patent
Hockey et al.

(10) Patent No.: US 12,335,233 B2
(45) Date of Patent: Jun. 17, 2025

(54) SECURING METRICS FOR A POD

(71) Applicant: MICROSOFT TECHNOLOGY LICENSING, LLC, Redmond, WA (US)

(72) Inventors: Alex John Hockey, London (GB); James Warren Turner, London (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 428 days.

(21) Appl. No.: 17/847,356

(22) Filed: Jun. 23, 2022

(65) Prior Publication Data
US 2023/0353535 A1 Nov. 2, 2023

(30) Foreign Application Priority Data

Apr. 28, 2022 (GB) ..................................... 2206224

(51) Int. Cl.
*H04L 9/40* (2022.01)

(52) U.S. Cl.
CPC ...... *H04L 63/0236* (2013.01); *H04L 63/0428* (2013.01)

(58) Field of Classification Search
CPC ............. H04L 63/0236; H04L 63/0428; G06F 21/6245
See application file for complete search history.

(56) References Cited

U.S. PATENT DOCUMENTS

| 11,457,080 | B1 * | 9/2022 | Meduri | ................... H04L 67/60 |
| 11,563,636 | B1 * | 1/2023 | Kairali | ................... H04L 67/562 |
| 11,876,692 | B2 * | 1/2024 | Mazzitelli | ............... H04L 41/12 |
| 2017/0251019 | A1 * | 8/2017 | Mazzitelli | ........... G06F 11/3452 |

(Continued)

FOREIGN PATENT DOCUMENTS

| CN | 101106451 | A | * | 1/2008 | | |
| CN | 112256392 | A | * | 1/2021 | ........... | G06F 21/577 |
| WO | WO-2021050343 | A1 | * | 3/2021 | ......... | G06F 9/45558 |

OTHER PUBLICATIONS

"Kubernetes Security-OWASP Cheat Sheet Series", Retrieved from: https://cheatsheetseries.owasp.org/cheatsheets/Kubernetes_Security_Cheat_Sheet.html, Retrieved On: May 4, 2023, 29 Pages.

(Continued)

*Primary Examiner* — Michael R Vaughan
(74) *Attorney, Agent, or Firm* — Han Gim; Newportip IP, LLC

(57) ABSTRACT

A computer-implemented method, data processing system and computer-readable medium for a pod of a container orchestration platform to secure metrics relating to the pod prior to transmission of metrics to a metrics collection service. The method comprising: receiving a secure request at a pod IP address and forwarding the request to a container of the pod; and receiving an insecure request at the pod IP address; examining the content of the received insecure request; from the examining, determining whether the received insecure request is requesting metrics information; if it was determined that the received insecure request does not request metrics information, passing the request to an original destination within the pod, and if it was determined that the received insecure request does request metrics information, rejecting the received insecure request.

20 Claims, 8 Drawing Sheets

(56) References Cited

U.S. PATENT DOCUMENTS

| | | | | |
|---|---|---|---|---|
| 2018/0288135 | A1* | 10/2018 | Narayan | H04L 67/10 |
| 2019/0306231 | A1* | 10/2019 | Shimoga Manjunatha | H04L 61/255 |
| 2020/0007405 | A1* | 1/2020 | Chitalia | H04L 41/14 |
| 2021/0019194 | A1* | 1/2021 | Bahl | H04L 67/1031 |
| 2021/0036935 | A1* | 2/2021 | Patwardhan | H04L 43/0882 |
| 2021/0406039 | A1* | 12/2021 | Theimer | G06F 8/36 |
| 2022/0086157 | A1* | 3/2022 | Masjuan | H04L 63/20 |
| 2023/0185594 | A1* | 6/2023 | Venkatram | G06F 9/45545 718/1 |
| 2023/0259415 | A1* | 8/2023 | Kairali | G06F 9/547 719/328 |

OTHER PUBLICATIONS

"Skipper", Retrieved from: https://opensource.zalando.com/skipper/, Retrieved On: May 12, 2023, 1 Page.

Koschel, et al., "A Look at Service Meshes", In Proceedings of 12th International Conference on Information, Intelligence, Systems & Applications, Jul. 12, 2021, 8 Pages.

"International Search Report and Written Opinion Issued in PCT Application No. PCT/US23/013368", Mailed Date: May 22, 2023, 10 Pages.

\* cited by examiner

SECURING METRICS FOR A POD

CROSS-REFERENCE TO RELATED APPLICATION(S)

This non-provisional utility application claims priority to UK patent application number 2206224.4 entitled "SECURING METRICS FOR A POD" and filed on Apr. 28, 2022, which is incorporated herein in its entirety by reference.

BACKGROUND

When implementing zero trust it is necessary to encrypt all network communications between machines where possible and ensure that the machines authenticate and authorize other machines. For Transmission Control Protocol (TCP) connections this is normally implemented using mutual Transport Layer Security (mTLS).

In container orchestration platforms, such as Kubernetes™ that are also known as K8s™, this is typically achieved by a service mesh. The service mesh is installed in a cluster and automatically performs encryption, authentication, and authorization. In a cluster, with hundreds of pods, it is useful to aggregate metrics information about the health of the pods into one place where the information can be viewed and processed. For example, Prometheus™ is a widely used solution for collecting metrics. During the collection of metrics, a service mesh proxy may expose metrics for collection not over an authenticated and/or encrypted connection, e.g. in plaintext and not secured using mTLS or the like. The present invention seeks to provide an alternative approach which overcomes at least some of the problems of present systems, including the secure collection of metrics from proxies.

The embodiments described below are not limited to implementations which solve any or all of the disadvantages of known systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer-implemented method, data processing system and computer-readable medium for a pod of a container orchestration platform to secure metrics relating to the pod prior to transmission of metrics to a metrics collection service. The method comprising: receiving a secure request at a pod IP address and forwarding the request to a container of the pod; and receiving an insecure request at the pod IP address; examining the content of the received insecure request; from the examining, determining whether the received insecure request is requesting metrics information; if it was determined that the received insecure request does not request metrics information, passing the request to an original destination within the pod, and if it was determined that the received insecure request does request metrics information, rejecting the received insecure request.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Although the present examples are described and illustrated herein as being implemented in a network management system that is capable of meeting zero trust requirements, the system described is provided as an example and not a limitation. As those skilled in the art will appreciate, the present examples are suitable for application in a variety of different types of network management systems, including by way of example a cloud-based network management system.

Described herein is an improved method for securing metrics for a pod of a container orchestration platform.

Figure 1:
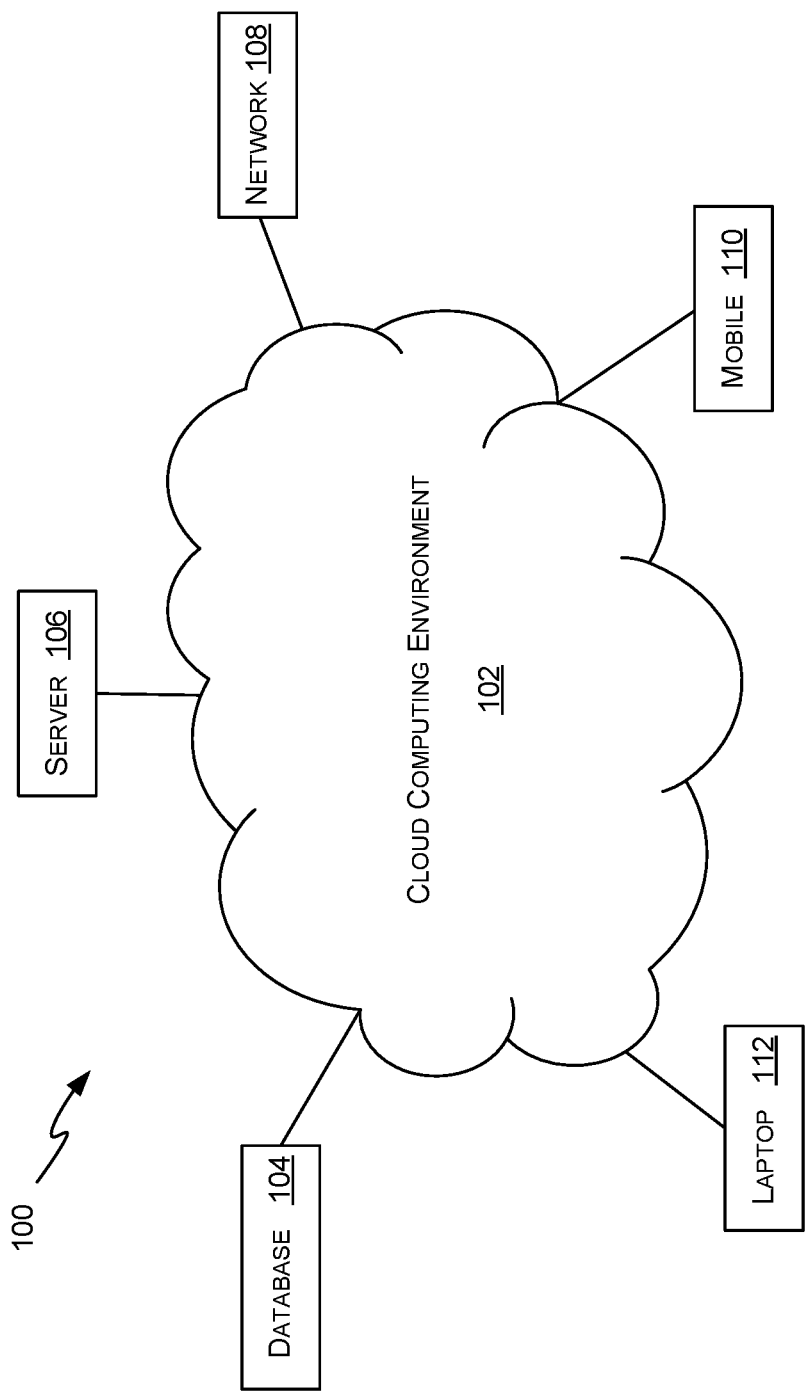
FIG. 1 is a schematic diagram of a cloud network management system according to the present invention.

FIG. 1 shows a cloud-based network management system 100. The system includes a cloud computing environment 102 connected to a number of external systems or resources. The external systems or resources include one or more of a database 104, a server 106, a network 108, a mobile device 110, and a computer or laptop 112. It will be appreciated that there could be many different or alternative external resources beyond the examples above.

The cloud computing environment 102 provides centralized resources which can be accessed by the external systems and resources. The centralized resources include one or more of an application, a platform, an infrastructure, storage, network tools, security related resources, etc.

In these types of environments there are many different functionalities and a need for communication between the different entities within the network. In a zero-trust set up all the communications should be encrypted to avoid plaintext messages and to prevent third parties potentially gaining access to entities or resources based on any plaintext messages that could be sniffed out. Further, entities in a zero-trust network should be authenticated so the authentication can be used to prevent unauthorized access.

A container orchestration platform relies on the creation and management of pods within a relevant computing environment, such as for example a cloud-based network management system 100. Container orchestration platforms, such as those comprising Kubernetes (K8s), are systems used to manage applications and their access to various cloud resources. K8s do not primarily focus on security but rather on providing functionality. As explained in more detail below, a service mesh may be used in combination with K8s to increase security as a service mesh enables communication between services to be secured because the service mesh can enforce policies to allow or deny communications between the services.

Figure 2:
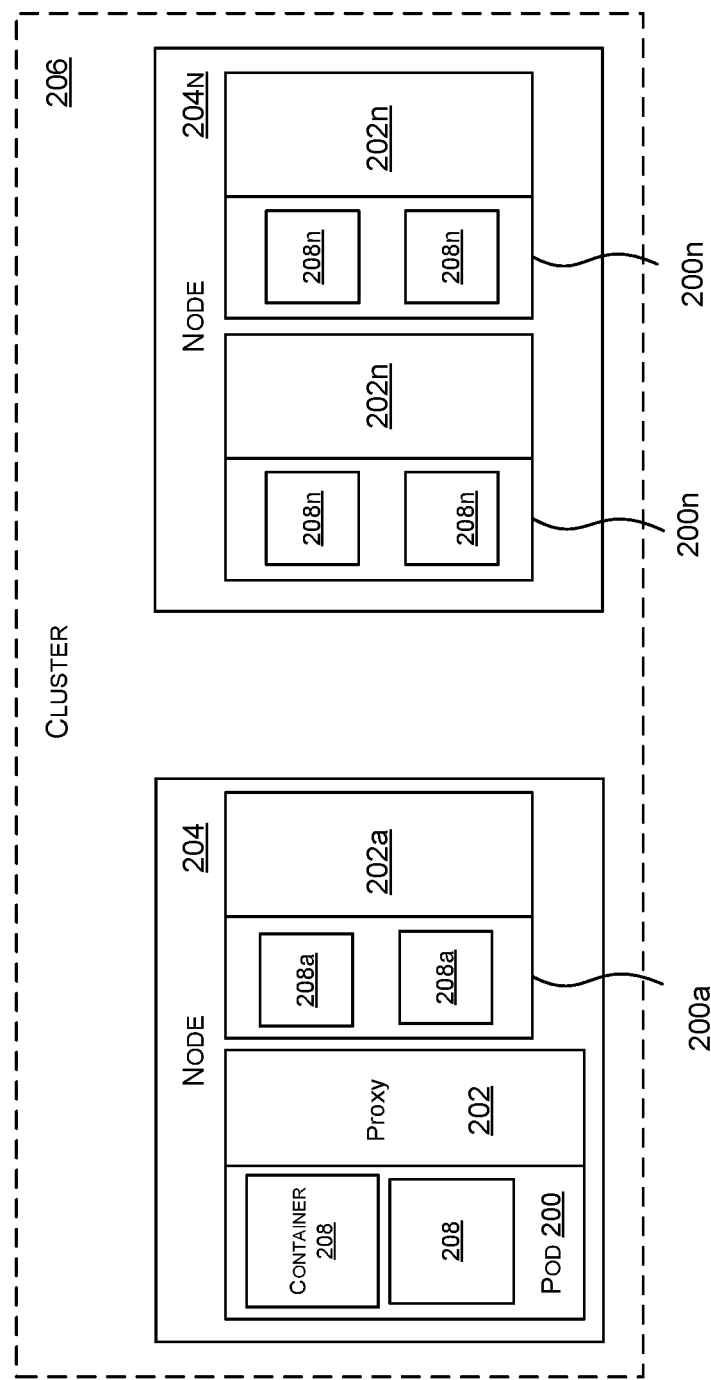
FIG. 2 is a schematic drawing of a container orchestration platform cluster.

FIG. 2 is a diagram showing an example architecture of a container orchestration platform and shows a plurality of pods 200 each having an associated proxy 202. A pod 200 has an associated pod IP address allowing applications to use ports without the risk of conflict with other pods. A pod 200 is a basic scheduling unit. The pod 200 is located in a node 204 which is part of a cluster 206. A node 204 is a machine where containers (workloads) are deployed. The cluster 206 may include a further node 204*n* or nodes. The illustrated further node 204*n* shows a further one or more pods 200*n* each having an associated proxy 202*n*. Inside each pod 202 there are one or more containers 208 also known as application containers. A pod is also referred to as a unit. A proxy may be provided in a proxy container distinct from one or more other containers in a pod that may be know as application containers.

The pod 200 is the smallest deployable unit in container orchestration platform, which is running one or more applications each providing at least one service. Each pod 200 is assigned a unique IP address. A service is an abstraction in front of number of pods providing resource management functions such as load balancing between the pods.

If one or more of the pods fail or are rescheduled, the service stays the same. This ensures a service can always be accessed, being passed to a different pod to undertake the actual work required to provide the service. There is generally a mapping between the services and which pod/pods can be used to implement the service.

The pod 200 includes the one or more containers 208 and storage, network resources and instructions on how to operate the container.

The container 208 is a package including an application or service and all the resources required to run the application or service in a single location.

The node 204, 204*n* comprise a virtual or physical machine, depending on the nature of the cluster. Each node includes a number of components which provide the services necessary to run a pod 200.

Multiple pods are combined in a cluster 206 and each pod is distinctive but may depend on other pods in the cluster.

In some container orchestration platforms, for example in K8s, a service mesh is used to both detect other services and communicate therewith. The service mesh identifies traffic that it needs authentication and encryption, e.g. to uplift to mutual Transport Layer Security (mTLS) by querying platforms for all services and comparing the destination of the traffic against a domain name, an IP address and a port associated with the services; if there is no match, the traffic will not be uplifted. A service mesh has been installed in the cluster 206 illustrated in FIG. 2. The service mesh has installed a proxy 202 into every pod by adding a proxy container. The proxy installed by a service mesh is sometimes called a sidecar proxy container. The service mesh has installed networking rules to enable application traffic (flowing to/from containers 208) to be redirected via the proxy 202.

Figure 3:
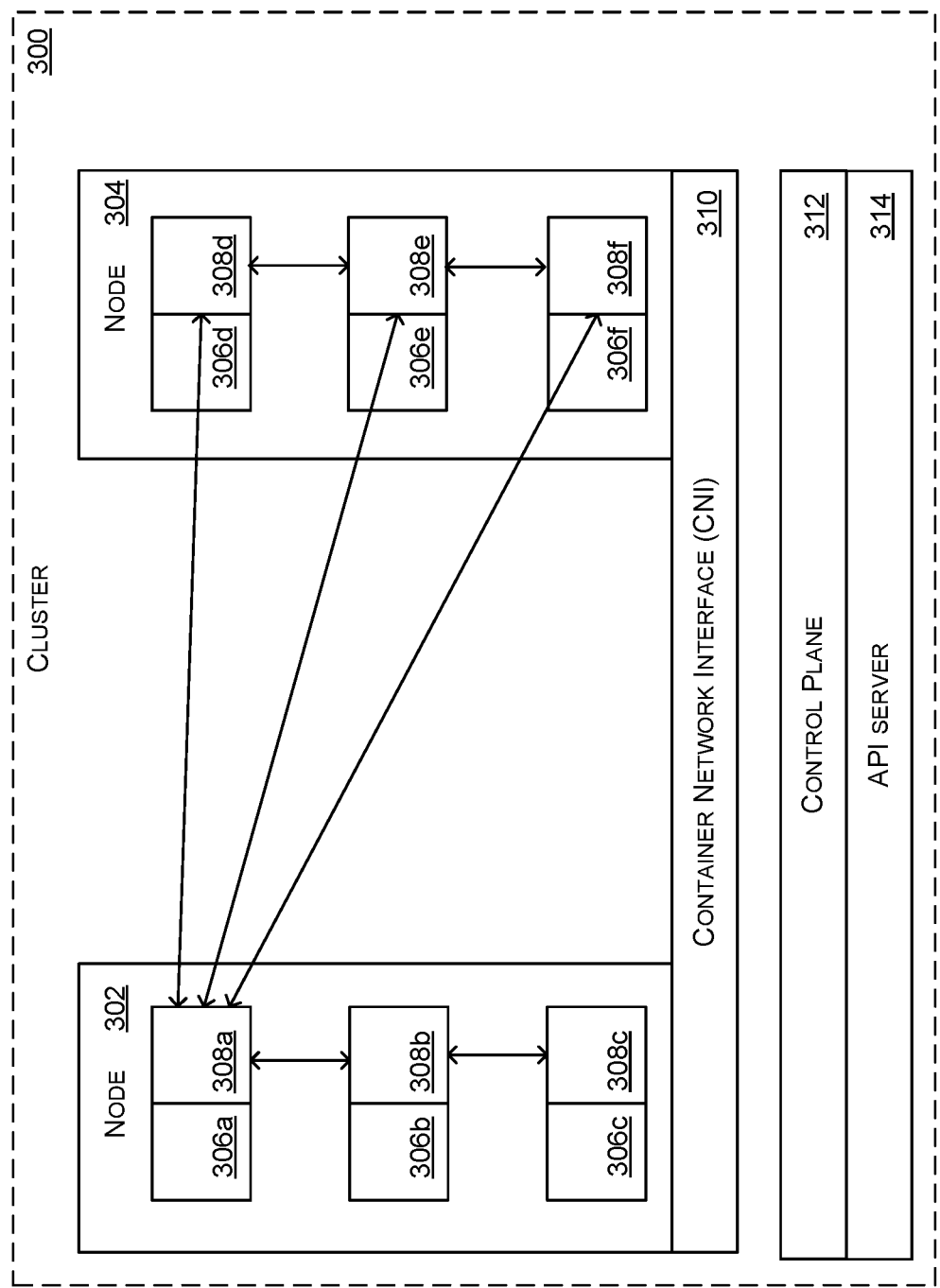
FIG. 3 is a further schematic drawing of a container orchestration platform cluster.

FIG. 3 shows a cluster 300 running a service mesh. The cluster 300 includes a number of nodes 302 and 304. There can be many more nodes than shown. A first node 302 includes a number of pods 306*a*, 306*b*, and 306*c* and associated proxies 308*a*, 308*b* and 308*c*. A second node 304 includes a number of pods 306*d*, 306*e*, and 306*f* and associated proxies 308*d*, 308*e* and 308*f*. There could be more or less pods and associated proxies than shown. In some cases, this can be many hundreds and even thousands of pods and proxies. The proxies are sometimes referred to as a "sidecar" of the pod. The proxies in a single node all communicate with one another and each one communicates with the proxies in the other nodes (only some of the lines of communication are shown, to avoid confusion).

The cluster 300 includes a container network interface (CNI) 310, a control plane 312 and an API server 314. Each of the proxies in all of the nodes communicates with the control plane to download relevant configuration for the pod in which the proxy operates.

The CNI 310 provides an outline which enables configuring network resources in a dynamic manner using specifications and libraries. The control plane 312 includes a number of components which manage pods and nodes in a given cluster. When a service mesh is in use, the service mesh control plane 312 installs a proxy 308 into every pod 306 along with networking rules to redirect incoming and outgoing traffic via the proxy. The proxy may include an HTTP router if installed and configured for handling HTTP traffic.

In many situations a whole network needs to be monitored. This means that some or all resources in the network are asked to provide metrics and communicate these back to a monitoring tool. As previously mentioned, an exemplary metrics collection platform frequently used by users is called Prometheus, however other monitoring tools include InfluxDB, Graphite, TSDB, or the like.

Referring back to FIG. 2, within a service mesh, a pod 200 may expose its own metrics on a metric collection endpoint on a HTTP port, which can be queried by a metrics collection platform. Specifically, a pod 200 may expose an endpoint or listen on a port because one of the constituent containers 208 of the pod 200 is doing so. Any container 208 in a pod, including main application containers or a proxy container, may expose a metrics endpoint leading to insecurity. A proxy container in a pod 200, providing a proxy for the pod 200, may expose its own metrics and it cannot act as a proxy to itself as it can for other containers 208 in the pod 200.

Often, these metrics endpoints are accessible over plaintext without any security, which is problematic if attempting to implement a zero-trust network. In the example illustrated in FIG. 2, a container 208 within a pod 200 may expose metrics in plain text via the proxy 202. Problematically, out of all the containers in a pod, a proxy container in the pod may provide a metric endpoint that is least likely to be encrypted.

The metrics made available by a metrics endpoint of a proxy container typically contain a large amount of information about an operation of the proxy and also the topology of an encompassing system. This means an attacker could use the metrics to determine a considerable amount of information about the encompassing system.

Within a service mesh, a container in a pod 200 may act as a server and listen on port A. The pod 200 may have proxy 202 that listens on port P. Network redirection rules redirect most traffic coming into a pod 200 from outside to port P on the proxy 202. The proxy 202 may then apply a policy (e.g. mTLS, authorization policy) before forwarding the connection onto a pod 200 on port A. However, the service mesh proxy may also expose a HTTP port, H, of a node pod 200 that hosts the metrics endpoint. Because the service mesh expects that incoming connections to H never require encryption, authentication or authorization, the traffic redirect rules that are installed exempt port H. Therefore, connections targeted at port H end up at the proxy without mTLS being applied. Is not normally possible to use the service mesh's security policy to secure the vulnerable non-encrypted metrics.

A further issue is that port H may host other administrative endpoints. For example, there could be a "health check" endpoint that is used to monitor the health of the proxy. Any solution that protects metrics collection using mTLS must not disrupt the functions performed by other endpoints on the same port.

Figure 4:
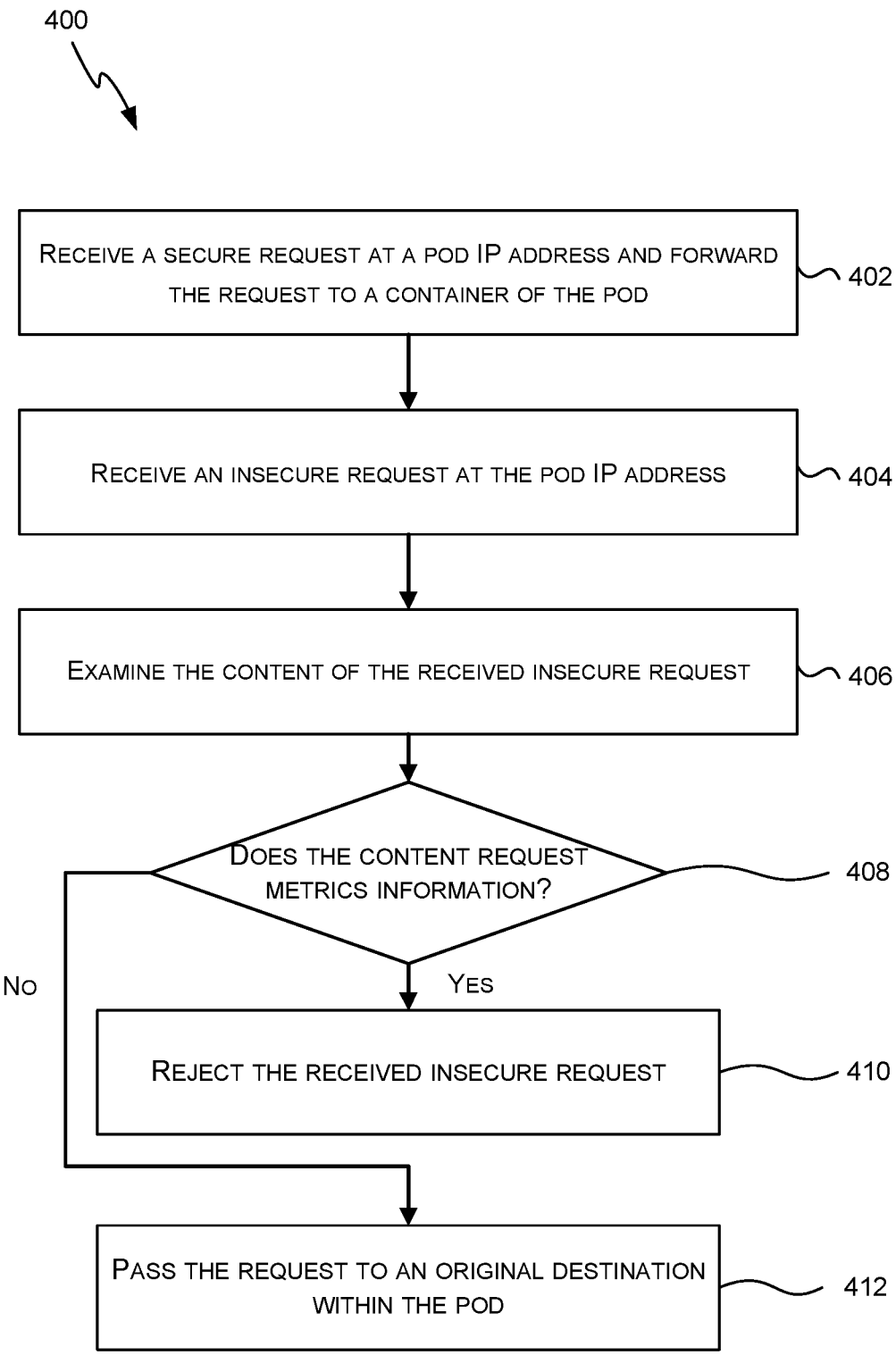
FIG. 4 is a flow diagram of a method for a pod of a container orchestration platform to secure metrics relating to the pod prior to transmission of metrics to a metrics collection service.

FIG. 4 illustrates a method 400 for a pod 200 of a container orchestration platform to secure metrics relating to the pod 200 prior to transmission to a metrics collection service.

At block 402, receive a secure request at a pod IP address and forward the request to a container of the pod.

At block 404, receive an insecure request at the pod IP address.

At block 406, examine the content of the received insecure request.

At decision block 408, determine whether the content request metrics information.

If yes, at block 410, reject the received insecure request. If no, at block 412, pass the request to its original destination within the pod.

An additional example method is provided below that addresses the technical problems discussed above:
  Step 1: receive a request at an IP address of a pod on a port used to serve metrics from the proxy (go to step 2).
  Step 2: examine the request at the proxy or delegate component (go to step 3).
  Step 3: is the request secured appropriately? (If yes, go to step 4; if no, go to step 6).
  Step 4: decrypt the request and pass the request to an insecure metrics port via in-pod communication (go to step 5).
  Step 5: return requested metrics information.
  Step 6: examine the content of the request. Is it a request for metrics information? (If yes, go to step 7; if no go to step 8).
  Step 7: reject the request.
  Step 8: forward the request to original destination for default handling.

Below is a discussion of three example methods and systems that address the technical problems discussed above.

Figure 5:
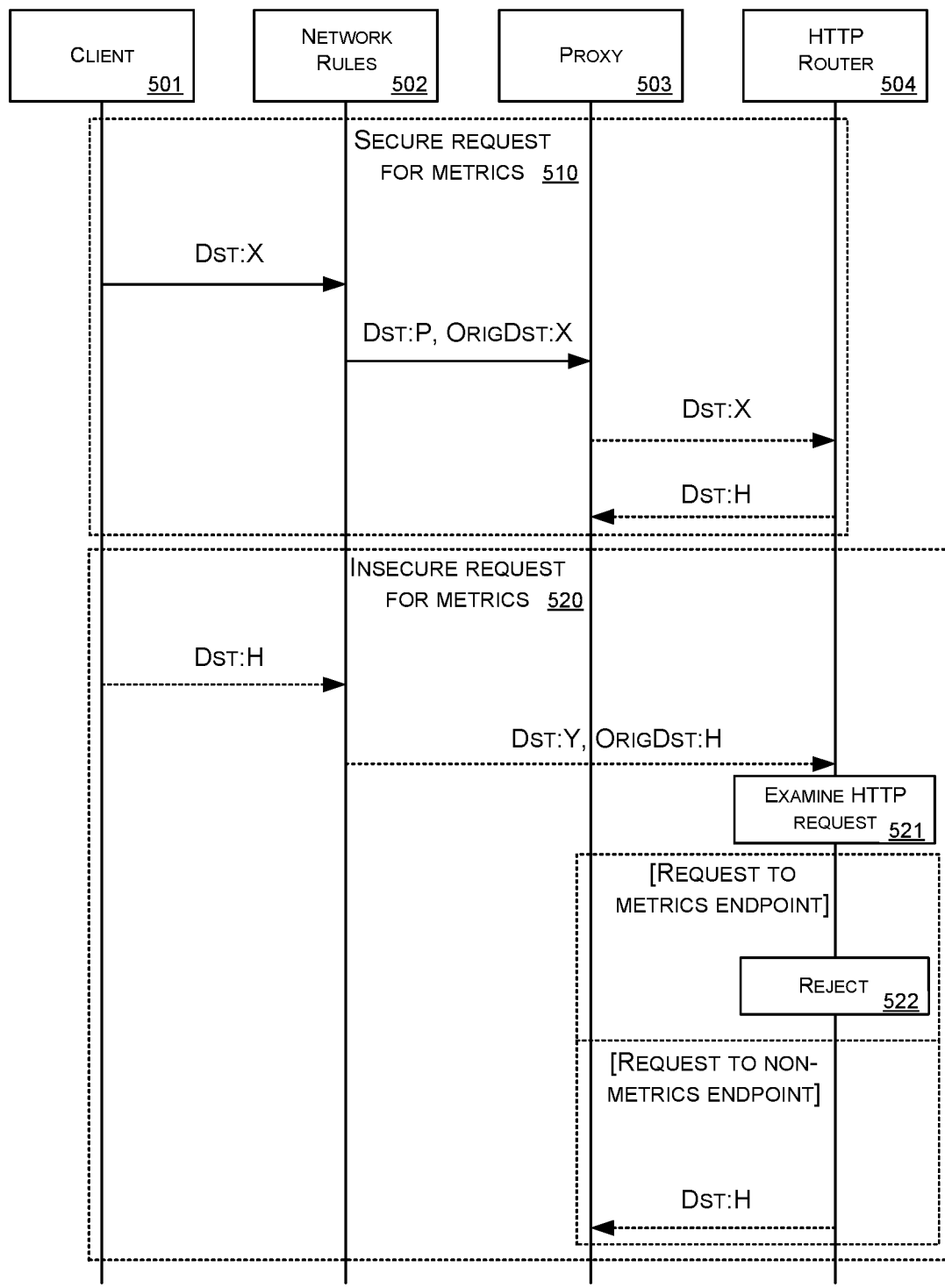
FIG. 5 is a swimlane flowchart illustrating a first exemplary method for processing both secure and insecure requests.

FIG. 5 is a swimlane flowchart illustrating a first exemplary method 500 for processing both secure and insecure requests. The parties and components involved are represented in blocks 501 to 504 at the top of the flowchart. A first dotted box 510 immediately below relates to a secure request for metrics and a second dotted box 520 immediately below the first relates to an insecure request for metrics.

Block 501 labelled 'Client' represents a party such as a metrics collection service that is making a request to a pod; block 502 labelled 'Network Rules' represents network rules implemented by the pod; block 503 labelled 'Proxy' represents a proxy associated with the pod; and block 504 labelled 'HTTP Router' represents a component of the pod that may be optionally installed to enable this first exemplary method.

The first dotted box 510 relating to a secure request for metrics may, for example, correspond to a request to a metrics endpoint over mTLS. The second dotted box 520 relating to an insecure request for metrics may, for example, correspond to a request made over plaintext.

Figure 6:
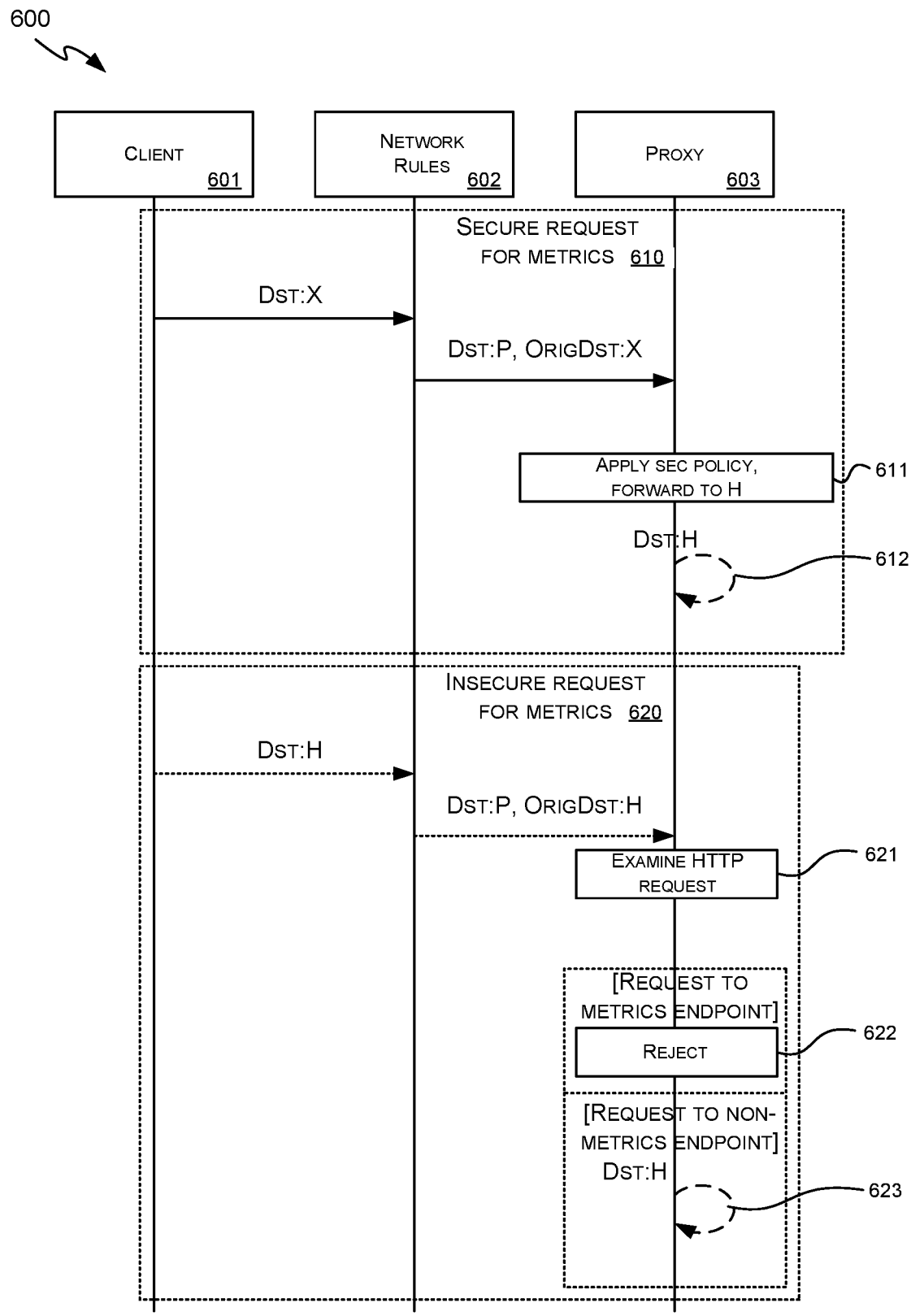
FIG. 6 is a swimlane flowchart illustrating a second exemplary method for processing both secure and insecure requests.
Figure 7:
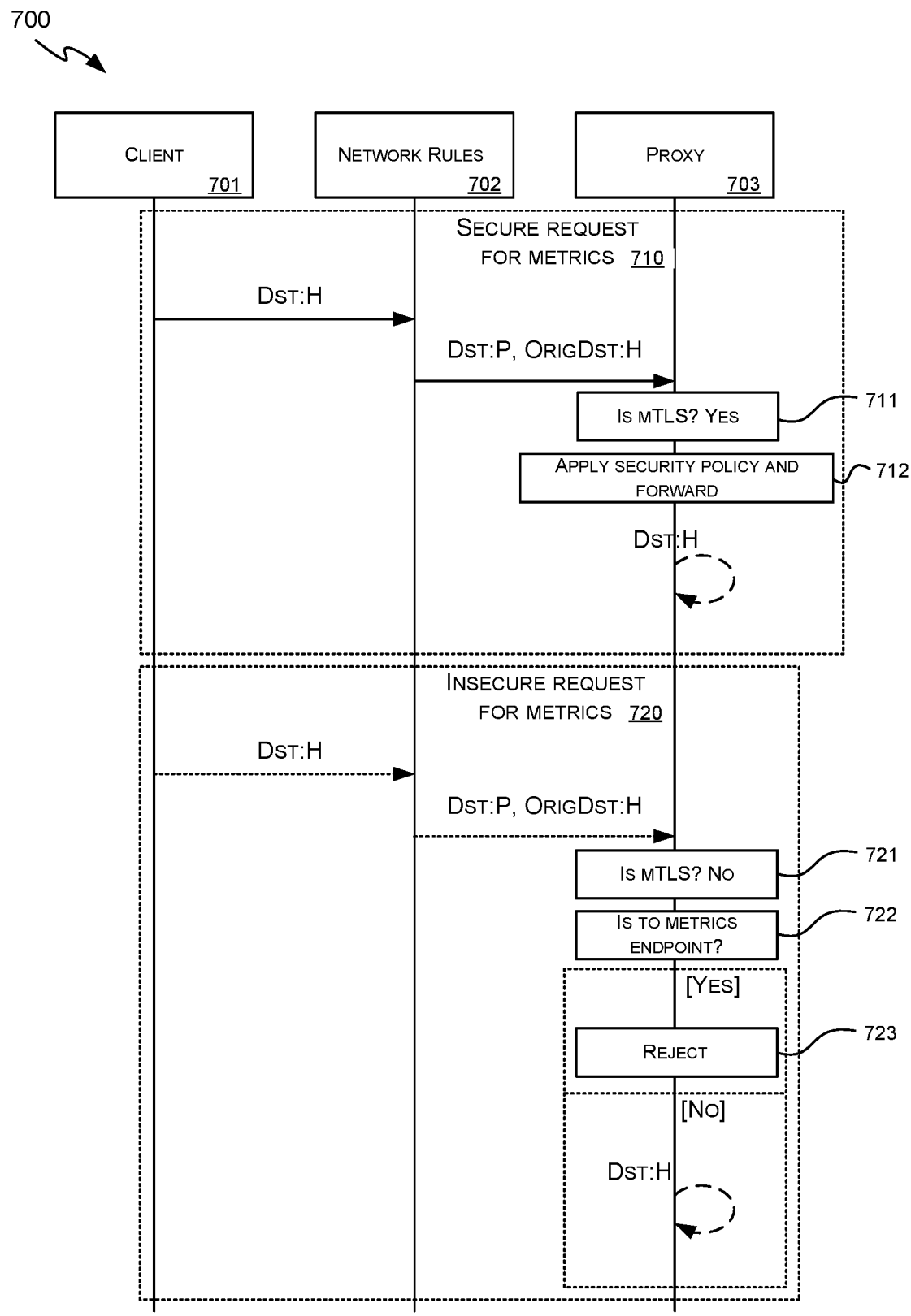
FIG. 7 is a swimlane flowchart illustrating a third exemplary method for processing both secure and insecure requests.

In FIGS. 5 to 7: a solid arrow corresponds to a secure communication method, such as an mTLS flow, while a dotted arrow corresponds to an insecure communication method, such as a plaintext flow; 'Dst' is an abbreviation of destination; 'OrigDst' is an abbreviation of original destination when a destination has changed; the port identifier 'H' identifies an HTTP port on the proxy that exposes a metrics endpoint and other non-metrics endpoints over insecure communication method; the port identifier 'P' identifies an a port on the proxy used to handle application traffic where traffic is redirected to this port using network redirection rules; the port identifier 'X' identifies an alternative port that exposes metrics over a secure communication method; and the port identifier 'Y' identifies an internal port used by HTTP router in FIG. 5.

In the first and second exemplary methods 500, 600 metrics may be exposed over mTLS on port X and other endpoints may be exposed over plaintext on port H. In the third exemplary method 700 metrics may be exposed over mTLS on port H and other endpoints may be exposed over plaintext on port H.

In the first exemplary method 500, mTLS-protected metrics are served over port X and other non-metrics HTTP endpoints are served over port H. The method requires installation of a separate HTTP routing container into each pod 200. This may be done manually, automatically using a custom mutating webhook, or by configuring the service mesh to inject a HTTP routing container at the same time it injects the proxy.

The HTTP routing container listens on two ports: Port X routes all HTTP traffic onto the proxy HTTP port H. Port Y routes HTTP traffic onto the proxy HTTP port H unless it is a metrics collection request.

The service mesh is instructed that the pod contains an application port X to handle traffic for and apply security policy to. A new networking rule is installed into the pod so connections to port H from outside are redirected to port Y.

These alterations have the affects two effects:

A first effect is that a request for metrics should be directed to port X. The request is redirected via the proxy where security policy is applied (and rejected if the connection does not satisfy the policy). It is then forwarded to the HTTP router, which forwards it onto port H, which is the final destination.

A second effect is that a request for other HTTP endpoints should made in plaintext to port H as previous. The request is redirected to port Y, which checks it is not a request to collect metrics (block 521). If it is, the request is rejected (block 522). Otherwise, the request it is forwarded onto H which is the final destination.

This approach does not require any flexibility from the service mesh, but it does require a new container (the HTTP router) is added to each pod.

FIG. 6 is a swimlane flowchart illustrating a second exemplary method 600 for processing both secure and insecure requests. The parties and components involved are represented in blocks 601 to 603 at the top of the flowchart. A first dotted box 610 immediately below relates to a secure request for metrics and a second dotted box 620 immediately below the first relates to an insecure request for metrics.

Block 601 labelled 'Client' represents a party such as a metrics collection service that is making a request to a pod; block 602 labelled 'Network Rules' represents network rules implemented by the pod; and block 603 labelled 'Proxy' represents a proxy associated with the pod.

The first dotted box 610 relating to a secure request for metrics may, for example, correspond to a request to a metrics endpoint over mTLS. The second dotted box 620 relating to an insecure request for metrics may, for example, correspond to a request made over plaintext.

Method 500 relies on installing HTTP routing functionality into a pod that includes the service mesh proxy. Often the proxy is itself capable of HTTP routing and, if the service mesh exposes the ability to add or modify a proxy configuration, the HTTP routing can be entirely performed by the proxy.

Method 600 illustrated in FIG. 6 requires that the service mesh is told that that the pod contains an application port X that it should handle traffic for and apply security policy to. A new networking rule is installed into the pod so that connections to port H from the outside world are redirected to port P (this is the port on the proxy that handles traffic going to the application container). The mesh is configured so that connections arriving at port P are handled as follows: (i) connections that were originally destined for port X must be made over mTLS, and will be subjected to a security policy; and (ii) connections that were originally destined for port H must be made over plaintext. The mesh must be further configured (requiring the ability to add or modify the proxy configuration: (iii) connections that were originally destined for port X are forwarded to port H; and (iv) connections that were originally destined for port H are forwarded to port H unless they are metrics collection requests.

A first effect is that a request for metrics should be directed to port X. It is redirected via the proxy where security policy is applied (and rejected if the connection does not satisfy the policy). The request is then forwarded onto port H that is the final destination.

A second effect is that a request for other HTTP endpoints should be made in plaintext to port H as before. The request is redirected via the proxy which accepts plaintext requests that were originally destined for port H. The request is then passed to an internal HTTP router which checks (block 621) it is not a request to collect metrics. If it is, the request is rejected (block 622). Otherwise, it is forwarded onto H which is the final destination.

FIG. 7 swimlane flowchart illustrating a third exemplary method 700 for processing both secure and insecure requests. The parties and components involved are represented in blocks 701 to 703 at the top of the flowchart. A first dotted box 710 immediately below relates to a secure request for metrics and a second dotted box 720 immediately below the first relates to an insecure request for metrics.

Block 701 labelled 'Client' represents a party such as a metrics collection service that is making a request to a pod; block 702 labelled 'Network Rules' represents network rules implemented by the pod; and block 703 labelled 'Proxy' represents a proxy associated with the pod.

The first dotted box 710 relating to a secure request for metrics may, for example, correspond to a request to a metrics endpoint over mTLS. The second dotted box 720 relating to an insecure request for metrics may, for example, correspond to a request made over plaintext.

Methods 500 and 600 both mean that encrypted metrics are exposed over a new port number X. If the service mesh can be configured such that it can receive both plaintext and mTLS connections on a single port number, and handle them differently, they can both be exposed on port H instead.

In method 700 mTLS-protected metrics are served over port H, and other non-metrics HTTP endpoints are served over port H using plaintext. The below alterations to the service mesh must be made. The service mesh is informed that the pod contains an application port H that it should handle traffic for and apply security policy to. A new networking rule is installed into the pod so that connections to port H from the outside world are redirected to port P (this is the port on the proxy that handles traffic going to the application container). The mesh is configured so that connections arriving at port P are handled as follows: (i) connections using mTLS should be subjected to security policy and forwarded onto port H; and (ii) connections using plaintext should be forwarded to port H unless they are metrics collection requests.

A first effect is that a request for metrics is directed to port H using mTLS. It is redirected via the proxy where security policy is applied (and rejected if the connection does not satisfy the policy). The request is then forwarded onto port H which is the final destination.

A second effect is that a request for other HTTP endpoints is made in plaintext to port H as before. The request is redirected via the proxy which accepts plaintext requests that were originally destined for port H. The request is then passed to an internal HTTP router which checks it is not a request to collect metrics. If it is, the request is rejected. Otherwise, it is forwarded onto H which is the final destination.

The example methods of FIGS. 5 to 7 involve installing a new networking rule into the pod. This can be achieved in a number of different ways including: (i) manually adding a new init-container (i.e. a container that runs when the pod is started) to the pod to configure the kernel with the rule; (ii) automatically adding a new init-container using an mutating admission controller; (iii) automatically adding a new init-container by configuring the service mesh to do so (assuming the service mesh provides such functionality); or (iv) overriding the init container that the service mesh uses, so that it sets up the normal service mesh network rules, and the new rule then added.

The above three examples enable metrics to be securely collected from service mesh proxies. This provides security benefits, such as attackers not being able read the metrics to gain knowledge about the system and move laterally, and observability benefits, i.e. since the metrics are secure, the operator can feel confident exposing information that is more informative, but that would be more sensitive if accessed by an attacker.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), Systemon-a-chip systems (SOCs), Complex Programmable Logic Devices (CPLDs), Graphics Processing Units (GPUs).

Components of an exemplary computing-based device 800 which are implemented as any form of a computing and/or electronic device, and in which embodiments of an improved container orchestration platform system and method having a monitoring service or methodology are implemented in some examples.

Computing-based device 800 comprises one or more processors 802 which are microprocessors, controllers or any other suitable type of processors for processing computer executable instructions to control the operation of the device. In some examples, for example where a system on a chip architecture is used, the processors 802 include one or more fixed function blocks (also referred to as accelerators) which implement a part of the method of improved container orchestration platform monitoring service or methodology in hardware (rather than software or firmware). Platform software comprising an operating system 804 or any other suitable platform software is provided at the computing-based device to enable application software 806 to be executed on the device.

The computer executable instructions are provided using any computer-readable media that is accessible by computing based device 800. Computer-readable media includes, for example, computer storage media such as memory 808 and communications media. Computer storage media, such as memory 08, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 808) is shown within the computing-based device 800 it will be appreciated that the storage is, in some examples, distributed or located remotely and accessed via a network or other communication link (e.g. using communication interface 810).

Figure 8:
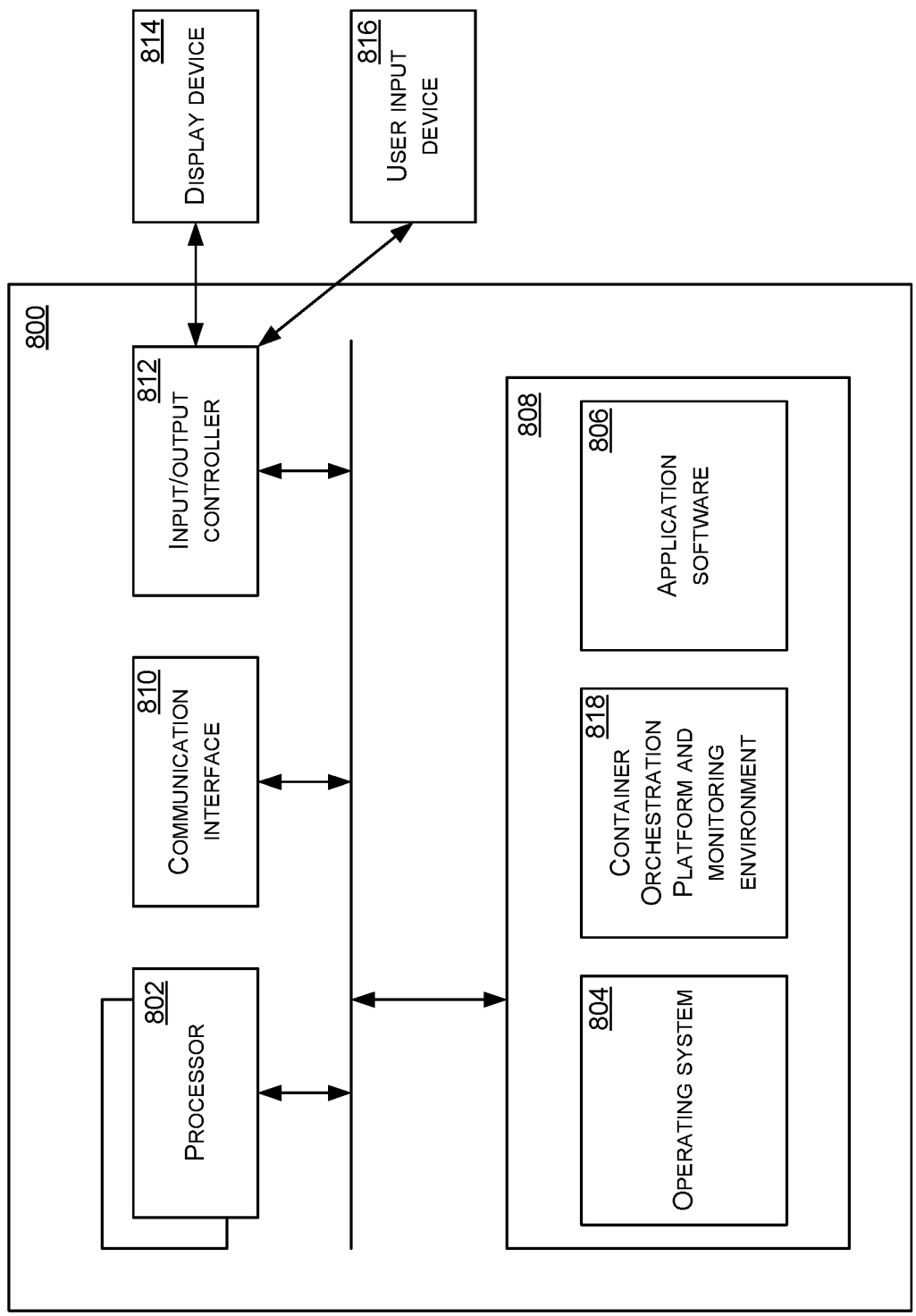
FIG. 8 illustrates an exemplary computing-based device in which examples disclosed here may be implemented.

The computer-based device 800 can include other functionality including but not limited to an input/output controller 812 which communicates with an internal or remote display device 814 and an internal or external user input device 816. A container orchestration platform and monitoring environment can be located within the computing system 818 as shown in FIG. 8. In a cloud-based environment, some or all of the elements forming part of the computer-based device 800 can be located in a central cloud resource.

Alternatively or in addition to the other examples described herein, examples include any combination of the following:

EXAMPLES

Example 1. A computer-implemented method for a pod of a container orchestration platform to secure metrics relating to the pod prior to transmission of metrics to a metrics collection service, the method comprising: receiving a secure request at a pod IP address and forwarding the request to a container of the pod; and receiving an insecure request at the pod IP address; examining the content of the received insecure request; from the examining, determining whether the received insecure request is requesting metrics information; if it was determined that the received insecure request does not request metrics information, passing the request to an original destination within the pod, and if it was determined that the received insecure request does request metrics information, rejecting the received insecure request.

Example 2. The computer-implemented method of example 1, wherein the secure and insecure requests received at the pod IP address are received on a port used to serve metrics.

Example 3. The computer-implemented method of example 1 or example 2, wherein the container the secure request is forwarded to is a proxy container.

Example 4. The computer-implemented method of any proceeding example, wherein the received insecure request is a HTTP request.

Example 5. The computer-implemented method of any preceding example, wherein forwarding the request to a container of the pod comprises: decrypting the secure request; passing the decrypted request to an insecure metrics endpoint within the pod; and generating, by the metrics endpoint, metrics information relating to the container of the pod.

Example 6. The computer-implemented method of any preceding example, wherein the received insecure request is directed to a HTTP router component of the pod that performs the determining.

Example 7. The computer-implemented method of any of examples 1 to 5, wherein a proxy associated with the pod performs HTTP routing within the pod.

Example 8. The computer-implemented method of example 6, wherein the received insecure request and the received secure request are both directed to the proxy by networking rules of the pod.

Example 9. The computer-implemented method of example 8, wherein the received insecure request and the received secure request are both directed to a single port of the proxy by networking rules of the pod.

Example 10. A data processing system for a pod of a container orchestration platform to secure metrics relating to the pod prior to transmission of metrics to a metrics collection service, the data processing system comprising a processor configured to receive a secure request at a pod IP address and forwarding the request to a container of the pod; and receive an insecure request at the pod IP address; examine the content of the received insecure request; from the examining, determine whether the received insecure request is requesting metrics information; if it was determined that the received insecure request does not request metrics information, pass the request to an original destination within the pod, and if it was determined that the received insecure request does request metrics information, reject the received insecure request.

Example 11. The computer-implemented method of example 10, wherein the secure and insecure requests received at the pod IP address are received on a port used to serve metrics.

Example 12. The computer-implemented method of example 10 or example 11, wherein the container the secure request is forwarded to is a proxy container.

Example 13. The computer-implemented method of any of examples 10 to 12, wherein the received insecure request is a HTTP request.

Example 14. The computer-implemented method of any of examples 10 to 13, wherein forwarding the request to a container of the pod comprises: decrypting the secure request; passing the decrypted request to an insecure metrics endpoint within the pod; and generating, by the metrics endpoint, metrics information relating to the container of the pod.

Example 15. The computer-implemented method of any of examples 10 to 14, wherein the received insecure request is directed to a HTTP router component of the pod that performs the determining.

Example 16. The computer-implemented method of any of examples 10 to 14, wherein a proxy associated with the pod performs HTTP routing within the pod.

Example 17. The computer-implemented method of example 15, wherein the received insecure request and the received secure request are both directed to the proxy by networking rules of the pod.

Example 18. The computer-implemented method of example 17, wherein the received insecure request and the received secure request are both directed to a single port of the proxy by networking rules of the pod.

Example 19. One or more computer-readable medium comprising instructions for a pod of a container orchestration platform to secure metrics relating to the pod prior to transmission of metrics to a metrics collection service which, when executed by a computer, cause the computer to carry out the method comprising: receiving a secure request at a pod IP address and forwarding the request to a container of the pod; and receiving an insecure request at the pod IP address; examining the content of the received insecure request; from the examining, determining whether the received insecure request is requesting metrics information; if it was determined that the received insecure request does not request metrics information, passing the request to an original destination within the pod, and if it was determined that the received insecure request does request metrics information, rejecting the received insecure request.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method for securing metrics relating to a pod orchestrated by a container orchestration platform implementing a service mesh, wherein a sidecar proxy container is installed in the pod along with network routing rules to redirect application traffic via the sidecar proxy container, the metrics secured prior to transmission of the metrics to a metrics collection service, the method comprising:
   receiving a secure request having an IP address of the pod;
   forwarding the secure request to a container of the pod identified by the IP address;
   receiving an unsecure request having the IP address of the pod;

redirecting, via the sidecar proxy container, the unsecure request to an internal router;

examining, by the internal router, content of the received unsecure request;

based on the examining, determining, by the internal router, whether the received unsecure request includes a request for metrics information;

passing, by the internal router, the received unsecure request to an original destination of the received unsecure request within the pod identified by the IP address when the received unsecure request does not include a request for metrics information; and rejecting, by the internal router, the received unsecure request when the received unsecure request includes a request for metrics information.

2. The computer-implemented method of claim 1, wherein the secure and unsecure requests received at the pod IP address are received on a port used to serve metrics.

3. The computer-implemented method of claim 1, wherein the container the secure request is forwarded to is a proxy container.

4. The computer-implemented method of claim 1, wherein the received unsecure request is a HTTP request.

5. The computer-implemented method of claim 1, wherein forwarding the secure request to the container of the pod comprises:
   decrypting the secure request;
   passing the decrypted request to an insecure metrics endpoint within the pod; and
   generating, by the metrics endpoint, metrics information relating to the container of the pod.

6. The computer-implemented method of claim 1, wherein the received unsecure request is directed to a HTTP router component of the pod that performs the determining.

7. The computer-implemented method of claim 1, wherein a proxy associated with the pod performs HTTP routing within the pod.

8. The computer-implemented method of claim 7, wherein the received unsecure request and the received secure request are both directed to the proxy by networking rules of the pod.

9. The computer-implemented method of claim 8, wherein the received unsecure request and the received secure request are directed to a single port of the proxy by networking rules of the pod.

10. A system comprising a computing device and an internal router, the system configured to:
    receive a secure request at a pod IP address, wherein the pod is orchestrated by a container orchestration platform implementing a service mesh, wherein a sidecar proxy container is installed in the pod along with network routing rules to redirect application traffic via the sidecar proxy container;
    forward the request to a container of the pod associated with the pod IP address;
    receive an unsecure request at the pod IP address;
    redirect, via the sidecar proxy container, the unsecure request to the internal router;
    examine, by the internal router, content of the received unsecure request;
    based on the examining, determine, by the internal router, whether the received unsecure request is requesting metrics information; and
    in response to determining that the received unsecure request does not request metrics information, pass, by the internal router, the request to an original destination within the pod.

11. The system of claim 10, wherein the secure and unsecure requests received at the pod IP address are received on a port used to serve metrics.

12. The system of claim 10, wherein the container the secure request is forwarded to is a proxy container.

13. The system of claim 10, wherein the received unsecure request is a HTTP request.

14. The system of claim 10, wherein forwarding the request to a container of the pod comprises:
    decrypting the secure request;
    passing the decrypted request to an unsecure metrics endpoint within the pod; and
    generating, by the metrics endpoint, metrics information relating to the container of the pod.

15. The system of claim 10, wherein the received unsecure request is directed to a HTTP router component of the pod that performs the determining.

16. The system of claim 10, wherein a proxy associated with the pod performs HTTP routing within the pod.

17. The system of claim 16, wherein the received unsecure request and the received secure request are both directed to the proxy by networking rules of the pod.

18. The system of claim 17, wherein the received unsecure request and the received secure request are both directed to a single port of the proxy by networking rules of the pod.

19. One or more non-transitory computer-readable media comprising computer-executable instructions which, when executed by one or more processors of a system, cause the system to perform operations comprising:
    receiving a secure request at a pod IP address and forwarding the request to a container of the pod associated with the IP address, wherein the pod is orchestrated by a container orchestration platform implementing a service mesh, wherein a sidecar proxy container is installed in the pod along with network routing rules to redirect application traffic via the sidecar proxy container;
    receiving an unsecure request at the pod IP address; and
    redirecting, via the sidecar proxy container, the unsecure request to an internal router configured to;
        examine content of the received unsecure request;
        based on the examining, determine that the received unsecure request is requesting metrics information; and
        in response to determining that the received insecure request does request metrics information, reject the received insecure request.

20. The non-transitory computer-readable media of claim 19, wherein the secure and unsecure requests received at the pod IP address are received on a port used to serve metrics.

* * * * *